3,180,907
VINYL CHLORIDE COPOLYMERS OF 2-METHYL-3-BUTYNE-2-OL AND 2-METHYL-3-BUTENE-2-OL

Archie E. Follett, Cary, N.C., assignor to Monsanto Company, a corporation of Delaware
No Drawing. Filed May 3, 1962, Ser. No. 192,093
7 Claims. (Cl. 260—87.5)

This invention relates to novel synthetic polymeric products and a process of preparing the same, and more particularly to copolymers of vinyl chloride with 2-methyl-3-butene-2-ol or with 2-methyl-3-butyne-2-ol.

Polymerized vinyl chloride as well as copolymers of vinyl chloride with various ethylenically unsaturated monomers have been known for many years. Such polymers have found utility in the production of fibers, films, coatings and molded articles. In the field of synthetic filaments, polymerized vinyl chloride and various copolymers of vinyl chloride have been found to produce filaments and fibers with generally satisfactory properties. However, there has been a desire to improve such properties as dye acceptance, boiling water shrinkage and decomposition temperature.

It is, therefore, an object of this invention to provide linear polymers derived from vinyl chloride and 2-methyl-3-butyne-2-ol or vinyl chloride and 2-methyl-3-butene-2-ol which can be formed into fibers, films, coatings and other useful materials.

It is another object of this invention to provide a method for the production of such new copolymers.

It is still another object of this invention to provide synthetic linear copolymers of vinyl chloride which can be formed into fibers and filaments having improved dyeability, a higher decomposition temperature and a lower boiling water shrinkage over vinyl chloride polymers and copolymers known heretofore.

Other objects and advantages of this invention will be readily appreciated by reference to the following detailed description.

In general, the objects of this invention are obtained by bringing together under reaction conditions vinyl chloride and 2-methyl-3-butyne-2-ol (hereinafter termed methyl butynol) or 2-methyl-3-butene-2-ol (hereinafter termed methyl butenol) and continuing the resulting reaction until a high molecular weight copolymer is obtained. Suitable molecular weights for fiber or film forming fall in the range of from about 10,000 to 40,000.

The proportions of monomers employed in the polymer forming reaction may be widely varied. The vinyl chloride monomer may be used in an amount of from 35 to 99 percent by weight and preferably from 51 to 95 percent. From about 1 to 65 percent by weight of methyl butenol or methyl butynol effectively produces the improvements attainable in the practice of this invention. Preferably from 5 to 49 percent methyl butenol or methyl butynol is employed.

The polymers may be prepared by mass polymerization, solution polymerization, emulsion polymerization, or aqueous suspension polymerization in conventional manner. The polymerization may be conducted in batch lots, by continuous methods or by semi-continuous methods. The reaction conditions during polymerization may be varied widely. Thus, the polymerization can be conducted at a temperature varying from the freezing point or just above the freezing point of the polymerization medium to about −13° C. when operating at atmospheric pressure and from −13° C. to about 150° C. or higher when conducting the polymerization under elevated pressure. The preferred temperature range when operating at atmospheric pressure is −50° to −15° C. while at elevated pressure of 25 to 125 p.s.i.g. a temperature of 20° to 60° C. is preferred.

The copolymerization reaction is advantageously carried out in the presence of known catalyst systems for vinyl chloride polymerization. These catalysts include the inorganic peroxides such as hydrogen peroxide, lithium, potassium or sodium perborates, alkali metal persulfates, organic peroxide such as benzoyl peroxide as well as tri-n-butylborane, and others. In emulsion systems polymerization can be effected by a free radical mechanism such as that initiated by peroxides, persulfates, hydroperoxides, diazo thioethers, and the like.

When conducting the copolymerization in a solvent medium, solvents which are inert to the reactants, are employed. These include the aliphatic alcohols such as methanol and ethanol; aliphatic hydrocarbons such as pentane, hexane, heptane, octane; ketones such as acetones; chlorinated hydrocarbons such as ethyl dichloride and tetrachloroethylene; toluene, xylene, glycols such as ethylene glycol, and mixtures of aliphatic hydrocarbons with chlorinated hydrocarbons.

When carrying out the polymerization in an emulsion polymerization system, various well-known emulsifying agents, dispersing agents and wetting agents may be employed. These include the alkali metal salts of fatty acids containing at least twelve carbon atoms such as sodium palmitate and potassium stearate; triethanol amine salts of long chain fatty acids such as palmitic acid or lauric acid; sulfated monoglycerides such as the sodium salt of sulfated glyceryl monolaurate; sulfated alcohols such as lauryl sulfate sodium salt; alkyl aryl sulfonates such as benzene lauryl sulfonate sodium salt; sulfated or sulfonated amides; sulfated or sulfonated amines; sulfated or sulfonated esters; cationic surface active agents such as quaternary ammonium compounds—alkyl dimethyl benzyl ammonium chloride and others.

Other additives that modify the polymers such as delusterants, plasticizers, pigments, colorants and oxidation inhibitors also may be incorporated in the polymer reaction if desired.

A particularly interesting and advantageous aspect of the copolymers prepared by reacting vinyl chloride with methyl butenol or methyl butynol is the fact that such copolymers contain free hydroxyl groups which are capable of further reaction and chemical modification as for example by reaction with di or polycarboxylic acid chain-branching agents or monocarboxylic chain terminating agents.

While the invention includes the production of polymers of relatively low molecular weight of from about 5,000 to 10,000 which may be useful in the manufacture of coating compositions, lacquers and the like, it is particularly concerned with the production of polymers which have film- and filament-forming properties. Filaments may be produced from the copolymers by melt spinning, i.e., by extruding a melted copolymer through orifices in a spinnerette into a cooling atmosphere. Filaments may also be produced by conventional wet or dry spinning methods from solutions of the copolymer. A number of suitable solvents for preparing copolymer solutions for wet and dry spinning methods include dimethyl formamide, methyl-ethylketone, cyclohexanone and tetrahydrofuran. If the polymer is of sufficiently high molecular weight, about 10,000 to 40,000, the filaments so formed may be drawn at comparatively low temperatures to filaments having excellent tenacity and elasticity.

In order to more fully and clearly elucidate the present invention, the following specific examples are presented. It is intended that the examples be considered as illustrative rather than limitative. In the examples, parts and percentages are in terms of weight.

*Example I*

To a glass tube was added 95 parts of vinyl chloride, 5 parts of methyl butenol, 200 parts of water, 0.5 part of K₂S₂O₈ (potassium persulfate), 0.5 part of Na₂S₂O₄ (sodium hydrosulfite), and 50 p.p.m. of ferrous ion in the form of ferrous sulfate. The tube was sealed and tumbled end-over-end at a speed of 50 r.p.m. in a bath maintained at 50° C. for a period of 16 hours. At the conclusion of the polymerization, the copolymer was isolated by filtration, washing with methanol and drying in vacuo at 50° C. It was found that an initial charge of 10 gm. of monomers had polymerized to a white polymer to give a yield of 4.5 percent.

A 10–15 percent solution of the vinyl chloride-methyl butenol copolymer in tetrahydrofuran was cast on plate glass by means of a Gardner Film Casting Knife and a film formed. The film was dried in vacuo at 50° C. The infrared spectrum was measured on the Perkin-Elmer "Infracord." In addition to the characteristic peaks for vinyl chloride, there was a strong absorption peak at 3.0 microns characteristic of the —OH group.

*Example II*

Vinyl chloride and methyl butenol were polymerized at low temperatures. Polymerizations were conducted in a stirred glass reactor equipped with a motor driven stirrer, cold trap, dropping funnel, thermometer, nitrogen inlet, and bath to maintain the temperature. A n-heptane solvent was first introduced into the reactor with the temperature being lowered to −30° C. The monomers were then added, after which a tri-n-butyl borane catalyst in a small amount of solvent was added dropwise over a period of two hours to the mixture. The ultimate formulation of the polymerization was as follows:

| | Parts |
|---|---|
| Vinyl chloride | 90 |
| Methyl butenol | 10 |
| n-Heptane | 200 |
| Tri-n-butyl borane | 1.02 |

A copolymer was formed after 6 hours of reaction time and was isolated by pouring the polymerization mixture into 3 volumes of methanol, filtering, washing with methanol and then drying in vacuo at 50° C. The isolated copolymer was soluble in cyclohexanone and tetrahydrofuran.

*Example III*

Vinyl chloride and methyl butynol were copolymerized precisely in accordance with the procedure, conditions and make-up of the polymerization system as described above in Example II, the sole exception being the substitution of methyl butynol for the methyl butenol of Example II.

The polymer obtained was found to be soluble in dimethyl formamide, methyl ethyl ketone, cyclohexanone, and tetrahydrofuran. A 10 to 15 percent solution of the copolymer in tetrahydrofuran was cast on plate glass by means of a Gardner Film Casting Knife. A film was formed which was dried in vacuo at 50° C. The infrared spectrum was measured on the Perkin-Elmer "Infracord." In addition to the characteristic peaks for vinyl chloride, there was a strong absorption peak at 3.0 microns characteristic of the —OH group.

*Example IV*

Vinyl chloride and methyl butenol were copolymerized in a stirred glass reactor equipped with a motor driven stirrer, cold trap, dropping funnel, thermometer, nitrogen inlet, and bath to maintain the temperature. A solvent, i.e. methanol, was introduced into the reactor and the temperature was lowered to −20° C. The monomers, tri-n-butyl borane and an aqueous ferrous sulfate solution were then added. Hydrogen peroxide in an alcohol solution was added dropwise to the polymerization system. The ultimate formulation of this system was as follows:

| | Parts |
|---|---|
| Vinyl chloride | 95 |
| Methyl butenol | 5 |
| Water | 200 |
| Methanol | 200 |
| Tri-n-butyl borane | 0.79 |
| Hydrogen peroxide | 0.065 |
| Fe⁺⁺(p.p.m.) | 10 |

A copolymer was formed after 5 hours' reaction time constituting a 34 percent yield.

The vinyl chloride-methyl butenol copolymer obtained in accordance with Example IV above was spun into fibers after which certain physical properties were measured and compared with those fibers derived from a known, commercial copolymer of vinyl chloride and vinyl acetate containing 96 parts by weight of vinyl chloride and 4 parts of vinyl acetate. Both types of polymers were spun from a solvent system of cyclohexanone into a spin bath consisting of 75 parts by weight of ethylene glycol and 25 parts of water. The spun yarn was dried in a vacuum at 100° C. for 15 minutes and heat set in air at 145° C. for 15 minutes. A comparison of physical measurements obtained follows:

| | Example IV fiber | Vinyl chloride-vinyl acetate fiber |
|---|---|---|
| Stretch | (¹) | (¹) |
| Boiling water shrinkage (5 min.) | 4.5 | 30 |
| Tenacity, gm./denier | 2.4 | 2.8 |
| Elongation, percent | 24.0 | 44.9 |

¹ Six times original length.

In order to determine the improvement realized in dye uptake by the presence of methyl butenol or methyl butynol in vinyl chloride type polymers, comparative dye tests were run wherein the polymers of Examples II and III above were compared with a homopolymer of polyvinyl chloride. The tests were conducted by employing a dispersed dye, Celliton Fast Blue AF, C.I. 61115, in identical concentrations and dyeing conditions. The following results were obtained.

| Composition: | Dye uptake in percent (60 minutes, at 100° C.) |
|---|---|
| Polyvinyl chloride | 32 |
| Example II | 50 |
| Example III | 44 |

It will be apparent that many widely different embodiments of this invention can be made without departing from the spirit and scope thereof, and therefore it is not intended to be limited execpt as indicated in the appended claims.

I claim:

1. A synthetic linear copolymer comprising vinyl chloride and a second monomer selected from the group consisting of 2-methyl-3-butene-2-ol and 2-methyl-3-butyne-2-ol wherein said vinyl chloride is present in a proportion of 35 to 99 percent by weight and said second monomer is present in a proportion of 1 to 65 percent by weight, said synthetic copolymer having a molecular weight between 5,000 and 40,000.

2. The copolymer of claim 1 wherein said second monomer is 2-methyl-3-butyne-2-ol.

3. A copolymer of claim 1 wherein said second monomer is 2-methyl-3-butene-2-ol.

4. The copolymer of claim 1 containing 51 to 95 percent vinyl chloride and 49 to 5 percent of said second monomer.

5. A process of producing a synthetic linear copolymer comprising reacting together a mixture of vinyl chloride and a second monomer selected from the group consisting of 2-methyl-3-butyne-2-ol and 2-methyl-3-butene-2-ol at a temperature of −50° C. to 150° C.

6. The process of claim 5 wherein the polymerization is conducted at a temperature of 20 to 60° C. and at a pressure of 25 to 125 p.s.i.g.

7. A process according to claim 5 wherein the polymerization is conducted at a temperature of −50 to −15° C. at atmospheric pressure.

No references cited.

JOSEPH L. SCHOFER, *Primary Examiner.*

WILLIAM H. SHORT, *Examiner.*